United States Patent  [10] Patent No.: US 8,451,511 B2
Haendler et al.  [45] Date of Patent: May 28, 2013

(54) METHOD AND DEVICE FOR OPTICALLY SCANNING AN OBJECT AND DEVICE

(75) Inventors: Erich Haendler, Lampertheim (DE); Norbert Oranth, Hirschberg (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 428 days.

(21) Appl. No.: 12/766,482

(22) Filed: Apr. 23, 2010

(65) Prior Publication Data

US 2010/0271670 A1 Oct. 28, 2010

(30) Foreign Application Priority Data

Apr. 24, 2009 (EP) .................................. 09005787

(51) Int. Cl.
*H04N 1/04* (2006.01)
*H04N 1/00* (2006.01)
*H04N 7/18* (2006.01)
*B41J 29/38* (2006.01)
*G11C 11/34* (2006.01)
*H01J 3/14* (2006.01)
*G06K 7/10* (2006.01)

(52) U.S. Cl.
USPC ............. 358/474; 358/403; 347/14; 348/142; 348/135; 348/61; 365/185.02; 365/185.09; 250/235; 235/454

(58) Field of Classification Search
USPC ..... 358/474, 403; 347/14; 235/454; 348/142, 348/135, 61; 365/185.02, 185.09; 250/235
See application file for complete search history.

(56) References Cited

U.S. PATENT DOCUMENTS

| 6,128,092 A * | 10/2000 | Levesque et al. ............. 356/451 |
| 7,268,345 B2 * | 9/2007 | Schultz ........................ 250/235 |
| 2003/0111534 A1 * | 6/2003 | Hillmann ..................... 235/454 |
| 2004/0051030 A1 | 3/2004 | Olszak et al. |
| 2009/0015875 A1 * | 1/2009 | Poor ............................. 358/403 |

FOREIGN PATENT DOCUMENTS

| EP | 1830218 A2 | 9/2007 |
| WO | WO 01/84209 A2 | 11/2001 |
| WO | WO 2006/023675 A2 | 3/2006 |

OTHER PUBLICATIONS

Partial International Search Report on Patentability for PCT/EP09005787 issued by the European Patent Office (2 pages).

* cited by examiner

*Primary Examiner* — Charlotte M Baker
*Assistant Examiner* — Rury Grisham
(74) *Attorney, Agent, or Firm* — Faegre Baker Daniels LLP

(57) ABSTRACT

A method and device for optically scanning an object is provided. A detection device optically scans a scanning region of the object by displacing the detection device and the object relative to one another into successive scanning positions spaced apart by a scanning step size along a scanning direction in an object plane. An optical imaging device generates a plurality of scanned images by imaging a partial scanning region from the object plane onto a detection surface in an image plane in the scanning positions. The plurality of scanned images are broken down into scanned part images and are combined to generate combined result images. At least one object measurement image is selected from the combined result images in accordance with one or more predetermined selection criteria.

20 Claims, 11 Drawing Sheets

METHOD AND DEVICE FOR OPTICALLY SCANNING AN OBJECT AND DEVICE

PRIORITY

This application claims the benefit of European Patent Application No. 09005787.8, filed on Apr. 24, 2009, the disclosure of which is incorporated by reference herein.

FIELD

The present disclosure relates to a method and device for optically scanning an object as well as to a computer program product configured to execute the method for optically scanning an object. More particularly, the present disclosure relates to a device, method, and computer program for optically scanning a testing element for a bodily fluid.

BACKGROUND AND SUMMARY

Methods of this type are used in order to investigate an object arranged on an object receptacle using an optical analysis. The optical scanning generally comprises a plurality of scanning steps in which the object and a detection device used for optical analysis are displaced relative to one another into a plurality of scanning positions, in order, in this manner, to capture a series of optically scanned images which can be evaluated. For example, the optical scanning method is used to optically analyse testing or sample elements for a bodily fluid. Analysing a testing or sample element for a bodily fluid is a matter of an analytical detection method in which the identification of one or a plurality of bodily fluids takes place using the optical detection of fluorescent and/or absorbent labels or molecules which are bound, created or destroyed at analytically specific structures on a substrate. The detection of the bodily fluid, for example blood, takes place in the region of one or a plurality of detection zones on the testing element. The detection zones have a strip-shaped or circular extent on the sample or testing element, for example.

In the case of optically scanning a testing element, test or excitation light is normally transmitted onto the testing element. With the aid of an optical imaging device, the region of the detection zone located in the optical plane is imaged into the image plane onto a photosensitive detection surface. The detection surface may comprise photodiodes or photomultipliers, for example. Two-dimensional row sensors and three-dimensional image sensors are also known, with which an intensity distribution of received measurement light can be optically detected.

In conventional optical scanning, a plurality of successive object images or scanned images is generated along the displacement direction during the relative movement between the object and the detection device, which can then be combined to form an overall image. Adjacent scanned images are placed in a row edge to edge, resulting in an optical overall image of the object to be investigated. A combining procedure of this type for the individual scanned images requires a high outlay in the case of the adjustment of the optical measurement or analysis device. If a plurality of objects are arranged and scanned one after the other in the region of the object receptacle, an individual adjustment of the measurement or analysis device is required for each scan. An unsatisfactory adjustment may affect the depth of field of the optical imaging when scanning. There is therefore a need for improved scanning techniques.

An improved method is provided for optically scanning an object, particularly a testing element for a bodily fluid, as well as a device for carrying out the method. The method and device reduce measurement uncertainties by reducing the adjustment outlay for the user. A computer program product for executing the method is also provided.

According to one embodiment, a method for optically scanning an object, particularly a testing element for a bodily fluid, comprises the following steps: optically scanning a scanning region of the object by means of a detection device by displacing the detection device and the object relatively to one another into successive scanning positions which are spaced apart by a scanning step size along a scanning direction in an object plane; generation of a plurality of scanned images by imaging a partial scanning region from the object plane onto a detection surface in an image plane by means of an optical imaging device in the scanning positions, wherein the partial scanning region has an extent in the scanning direction in the object plane which is larger than the scanning step size; breaking down the plurality of scanned images into scanned part images in each case by means of image processing, generation of combined result images by combining a plurality of scanned part images in each case; and selection of at least one object measurement image from the combined result images in accordance with one or a plurality of predetermined selection criteria.

According to another embodiment, a device for optically scanning an object, particularly a testing element for a bodily fluid, is created with an object receptacle, an optical detection device, a displacement device configured to displace the object receptacle and the detection device relatively to one another in successive scanning positions during the optical scanning of an object arranged on the object receptacle, and a control device configured to control the optical scanning according to the previous method.

According to another embodiment, a computer program product is provided with program code that is stored on a computer-readable storage medium and that includes instructions that instruct an optical scanning device to optically scan a scanning region of an object by displacing an optical detection device relative to the object into successive scanning positions which are spaced apart by a scanning step size along a scanning direction in an object plane, generate a plurality of scanned images by imaging a partial scanning region from the object plane onto a detection surface of the optical detection device in an image plane using an optical imaging device in the scanning positions, wherein the partial scanning region has an extent in the scanning direction in the object plane which is larger than the scanning step size, break down the plurality of scanned images into scanned part images in each case using image processing, generate combined result images by combining a plurality of scanned part images in each case, and select at least one object measurement image from the combined result images in accordance with one or a plurality of predetermined selection criteria.

According to yet another embodiment, a method of optically scanning a scanning region of an object is provided, the method comprising the steps of displacing a detection device relative to the object into successive scanning positions spaced apart by a scanning step size along a scanning direction, generating a plurality of scanned images by imaging a partial scanning region of the object onto a detection surface of the detection device at each scanning position, the partial scanning region having a size in the scanning direction larger than the scanning step size, breaking down each scanned image into a plurality of scanned part images, and generating at least one combined result image by combining scanned part images from the plurality of scanned images.

According to a further embodiment, a device for optically scanning an object is provided, the device comprising an object receptacle, an optical detection device configured to generate a scanned image of an object positioned on the object receptacle by imaging a partial scanning region of the object, a displacement device configured to displace the optical detection device relative to the object receptacle into successive scanning positions spaced apart by a scanning step size along a scanning direction, the optical detection device being configured to generate a scanned image at each scanning position, the partial scanning region of the object having a size in the scanning direction larger than the scanning step size, and a control device configured to control the optical scanning of the object, the control device being configured to break down each scanned image into a plurality of scanned part images and to generate at least one combined result image by combining scanned part images from the plurality of scanned images.

BRIEF DESCRIPTION OF THE DRAWINGS

The invention is illustrated in more detail in the following by the way of exemplary embodiments, with reference to the drawings in which.

DETAILED DESCRIPTION OF THE DRAWINGS

Figure 1:
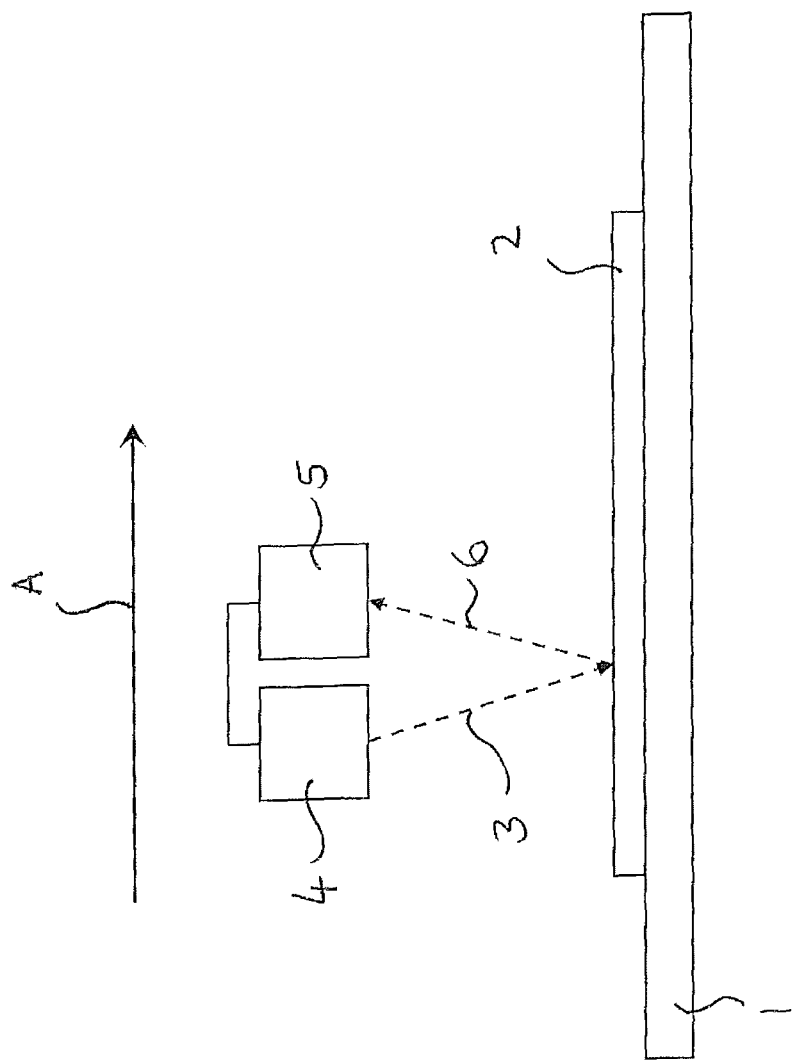
FIG. 1 illustrates a schematic representation of a measurement device for optically scanning an object arranged in an object plane, particularly a sample or a testing element.

FIG. 1 illustrates a schematic representation of a measurement system for optically scanning an object, particularly a sample or testing element for a bodily fluid. An object 2 to be analysed by means of optical scanning is arranged on an object receptacle 1. In the illustrated embodiment, test or excitation light rays 3 from a measurement light source 4, which is comprised together with a scanner or detector 5 of a detector device, are irradiated onto the object 2. With the aid of the scanner 5, which has an imaging system as well as a detection surface, measurement light is captured in the form of fluorescence, reflection, and/or absorption light from the sample 2, so that optical images can be generated, namely scanned images which may also be captured as digital image data. With the aid of image evaluation or image processing software, the captured image data is subsequently evaluated, for example, for identifying a bodily fluid.

During optical scanning, the object receptacle 1 with the object 2 arranged thereon and the detection device are displaced relative to one another along a scanning direction illustrated in FIG. 1 by an Arrow A. In the various relative positions which may be designated as scanning positions, a respective scanned image is generated on the detector 5.

Figure 2:
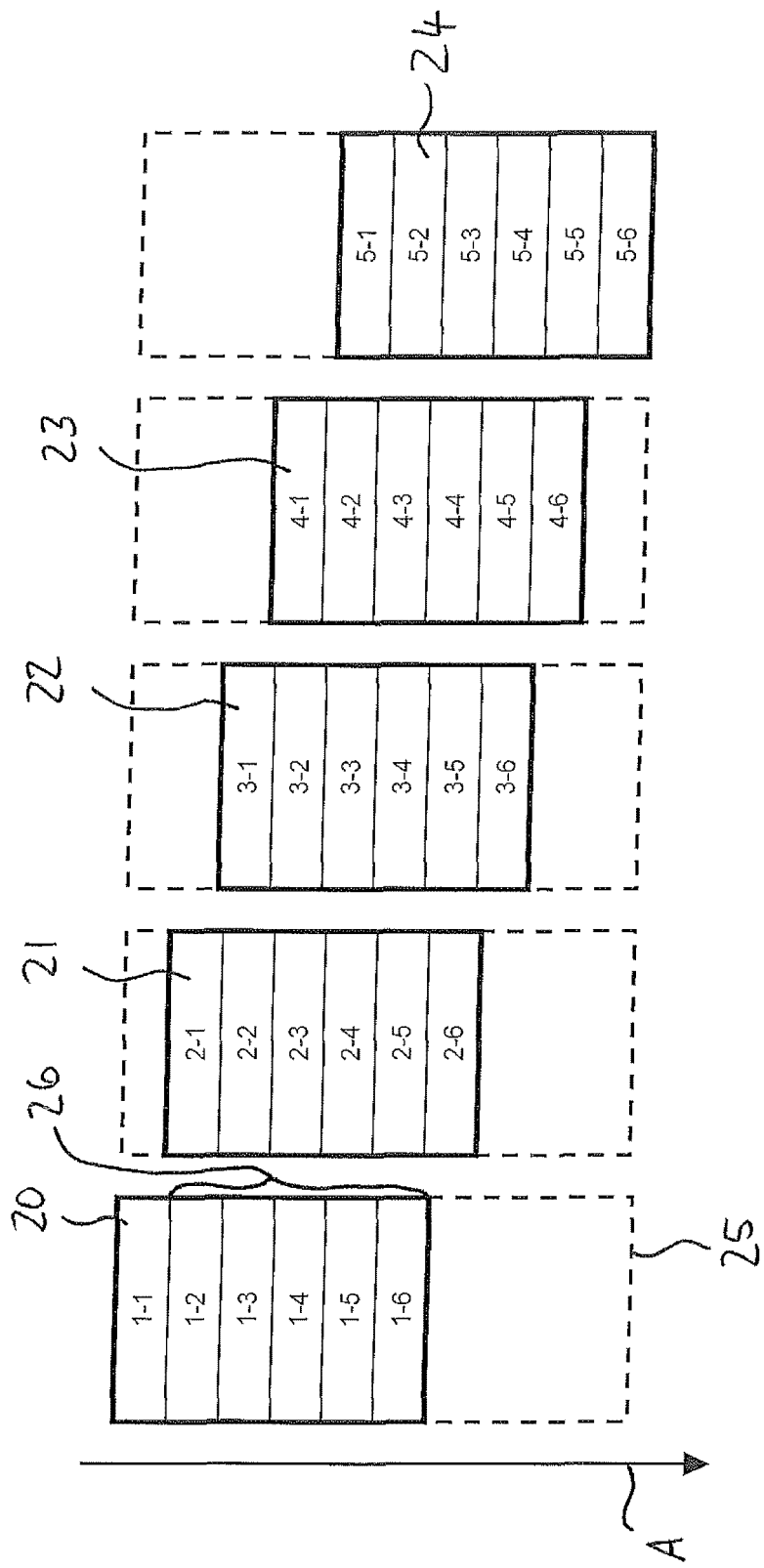
FIG. 2 illustrates a schematic representation with five scanned images captured by means of optical scanning.

FIG. 2 illustrates a schematic representation of five scanned images 20, 21, 22, 23, 24 generated one after the other using optical scanning in the image plane. The arrow A schematically illustrates the scanning direction in FIG. 2. The displacement between adjacent scan positions corresponds to one scanning step size, which illustratively corresponds in the image plane to the width of the part strips of the illustrated scanned images. In the illustrated embodiment, the scanning step size in the image plane illustrated in FIG. 2 corresponds to the width of a pixel row on the detection surface of the detection device. The overall scanning region 25 scanned in the object plane in this exemplary embodiment is furthermore represented schematically in FIG. 2.

In FIG. 2, the reference numbers 1-1 through 5-6 designate respective strip-shaped sections of the scanned images 20 through 24 and correspond to an assigned strip on the detection surface used in the image plane, i.e., to the row width of a row arrangement of pixels. In the illustrated embodiment, this strip width is also used in breaking down the scanned images 20-24, as described in more detail herein with reference to FIG. 3.

The scanned images 20-24 illustrated in FIG. 2 are recorded in five scan positions. The scanned images in each case each correspond to an imaging of a partial scanning region of the overall scanning region 25 and are illustrated next to one another and offset in scanning direction A by the scanning step size. As illustrated in FIG. 2, at least adjacent scanned images have an overlapping region 26. Here, overlapping region 26 is a partial region of the overall scanning region 25 of the sample, which is illustrated in both adjacent scanned images.

Figure 3:
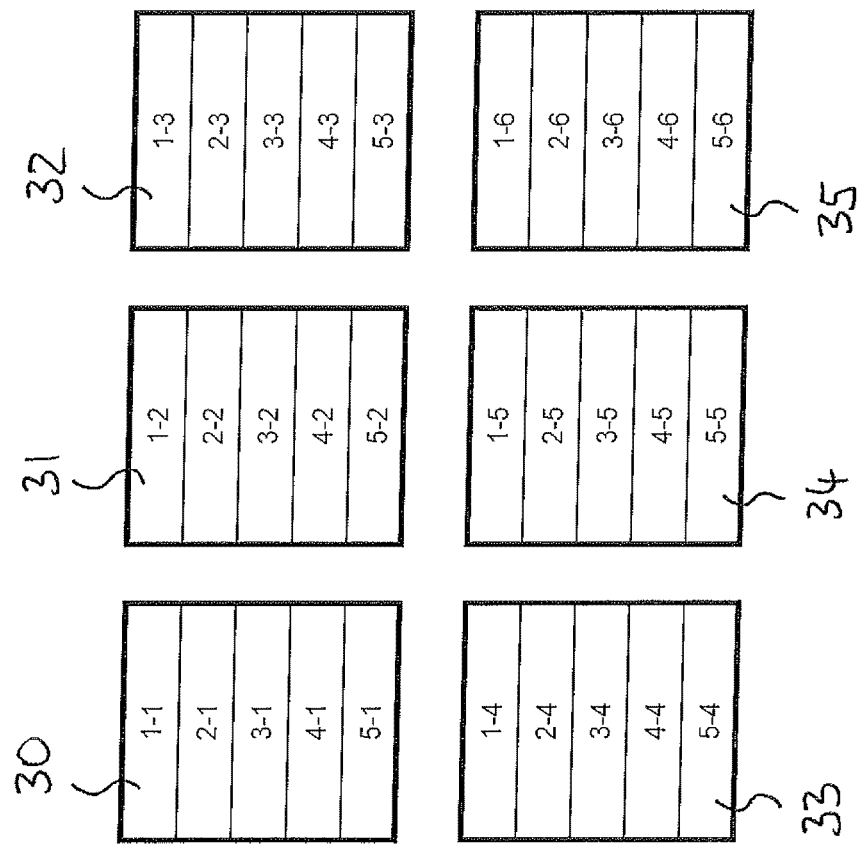
FIG. 3 illustrates a schematic representation with six scanned part images formed by means of breaking down the scanned images from FIG. 2.

After recording the scanned images in accordance with FIG. 2, the scanned images are broken down into strip-shaped scanned part images and combined to form various combined result images 30, 31, 32, 33, 34, 35, as illustrated in FIG. 3. Each combined result image 30-35 of FIG. 3 contains exactly one strip-shaped scanned part image from the five scanned images 20-24 of FIG. 2. For example, the combined result image 30 contains the first strip section from each of scanned images 20 through 24, namely the strip sections 1-1, 2-1, 3-1, 4-1 and 5-1. The combined result images 30-35 in FIG. 3 may then be analysed with respect to one or a plurality of selection criteria, particularly with the aid of image evaluation software to select the selection criterion/criteria in accordance with one or a plurality of object measurement images. For example, image evaluation software may be provided to filter the combined result image having the greatest overall brightness out of the six combined result images 30-35 in FIG. 3.

Figure 4:
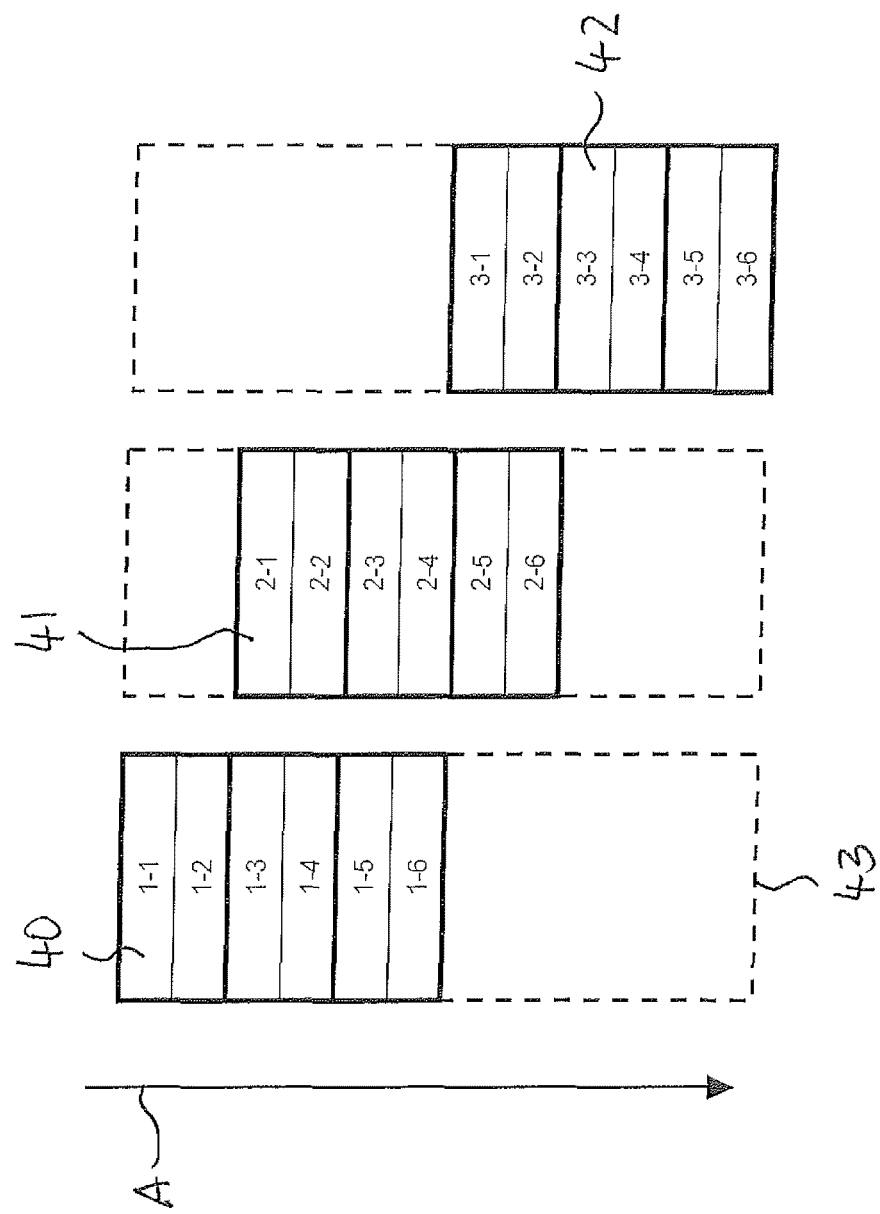
FIG. 4 illustrates a schematic representation with three scanned images captured by means of optical scanning.
Figure 5:
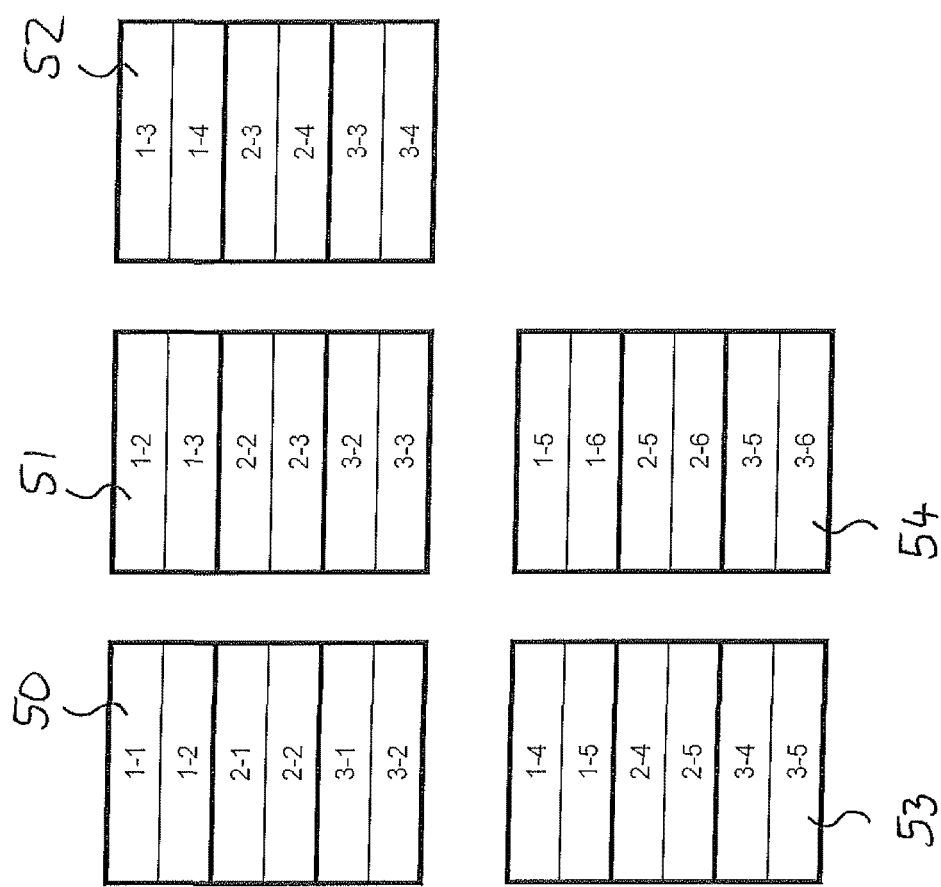
FIG. 5 illustrates a schematic representation of five scanned part images generated by means of breaking down the scanned images from FIG. 4.

FIGS. 4 and 5 provide a further exemplary embodiment according to the previously described method for optical scanning. According to FIG. 4, three scanned images 40, 41, 42 are captured in successive scan positions. The scanning step size in the image plane illustrated in FIG. 4 corresponds to the width of two pixel rows on the detection surface of the detection device. The overall scanning region 43 is also illustrated in FIG. 4.

FIG. 5 illustrates the combination of the strip-shaped scanned part images obtained from the scanned images 40, 41, 42 of FIG. 4 to a plurality of combined result images 50, 51, 52, 53, 54 from which one object measurement image may be selected in accordance with one or a plurality of selection criteria.

Figure 6:
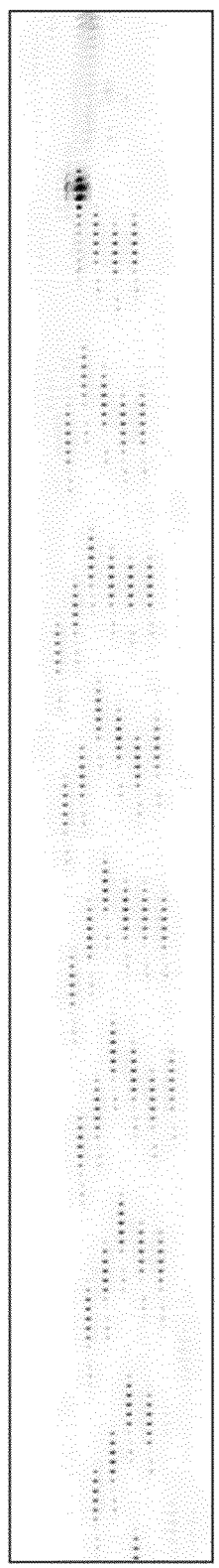
FIG. 6 illustrates scanned images placed in a row edge to edge.

FIG. 6 illustrates scanned images placed in a row edge to edge. In the illustrated embodiment of FIG. 6, 163 scanned images recorded by scanning are placed in a row in accordance with the conventional "edge to edge" method, wherein the scanned images in each case take up 12 rows of detection elements in the region of the detection surface.

Figure 7:
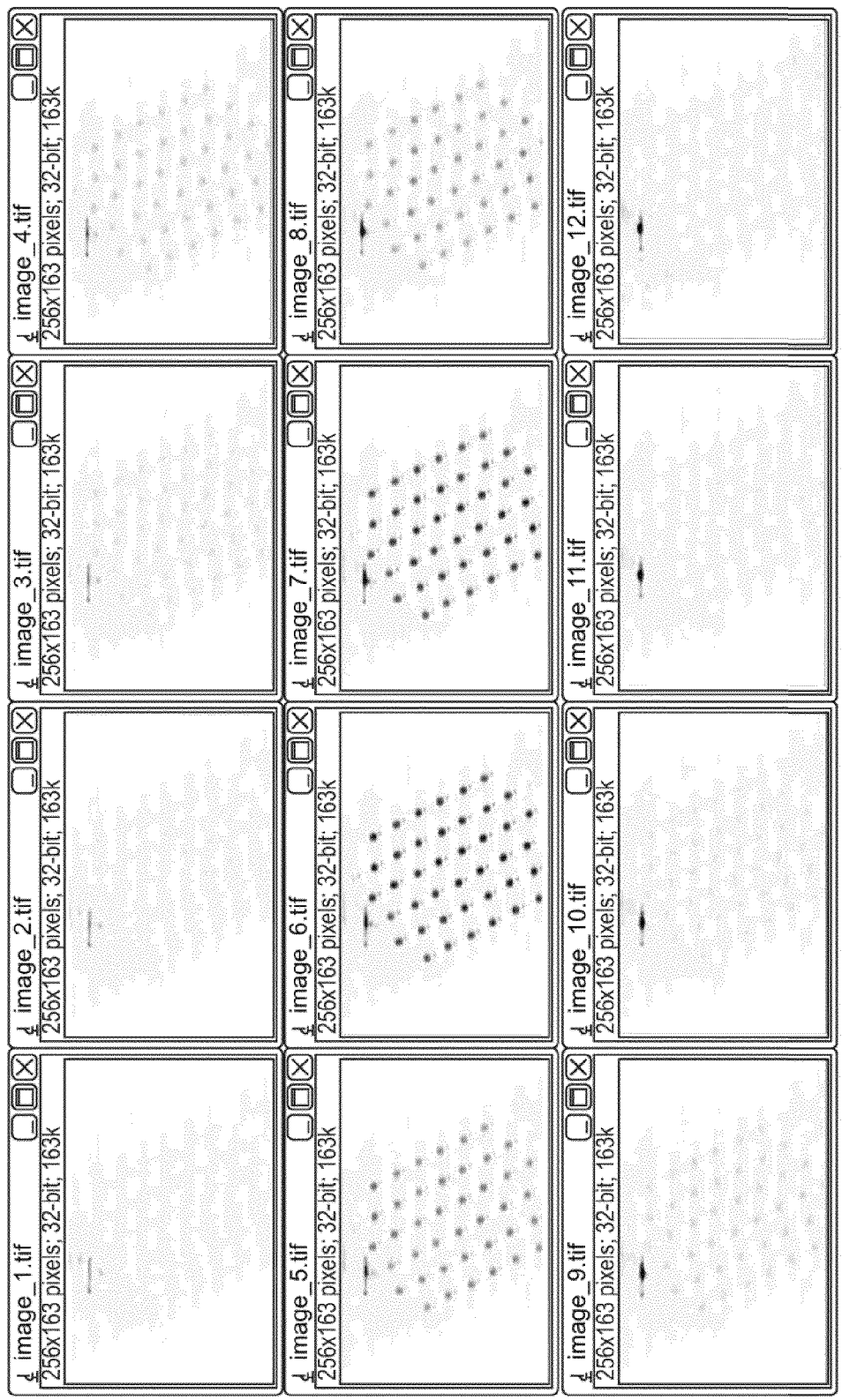
FIG. 7 illustrates a plurality of combined result images obtained from the scanned images in FIG. 6 by means of breaking down and combining.
Figure 8:
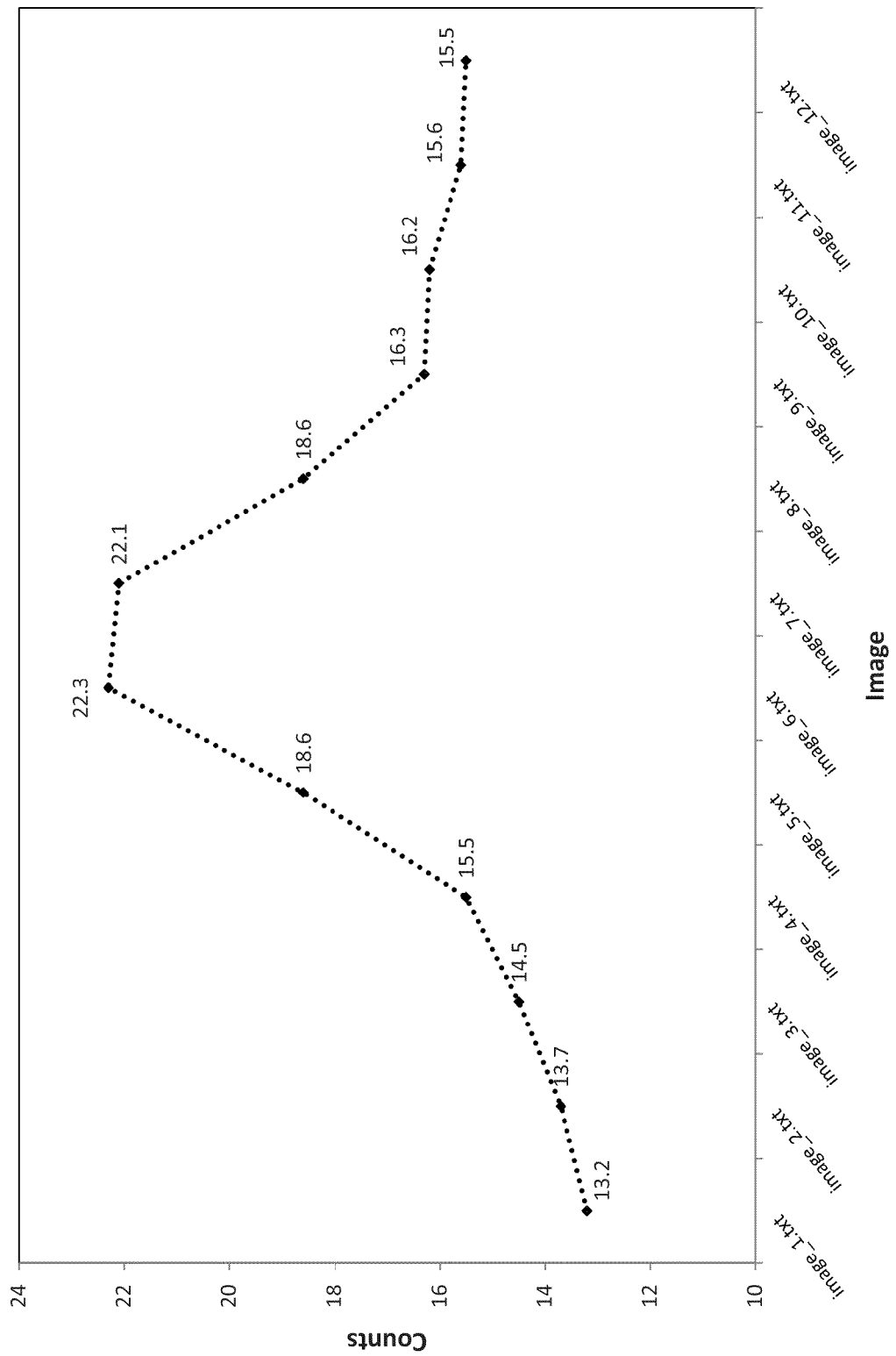
FIG. 8 illustrates a graphical representation for the respective overall brightness of the combined result images from FIG. 7.

FIG. 7 illustrates 12 result images obtained from the scanned images in accordance with the above-described method of the present disclosure by generating strip-shaped scanned part images and joining them to form combined result images, namely the 12 images shown. FIG. 8 illustrates a graphical representation for the respective overall brightness of the combined result images from FIG. 8. The result is that two of the combined result images with exemplary relative values of 22.3 and 22.1 have the highest image brightness value.

Figure 9:
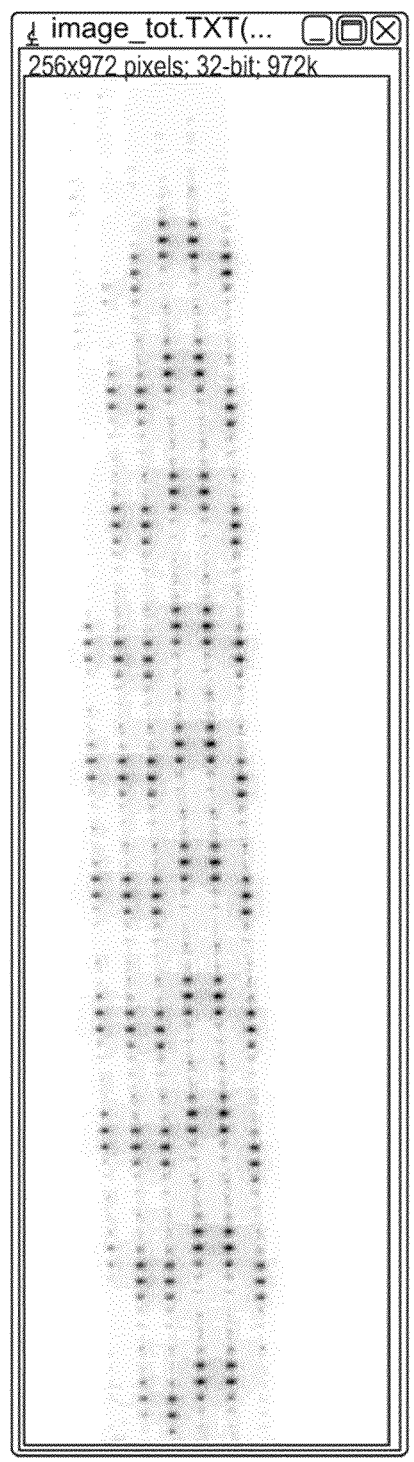
FIG. 9 illustrates scanned images placed in a row edge to edge.
Figure 10:
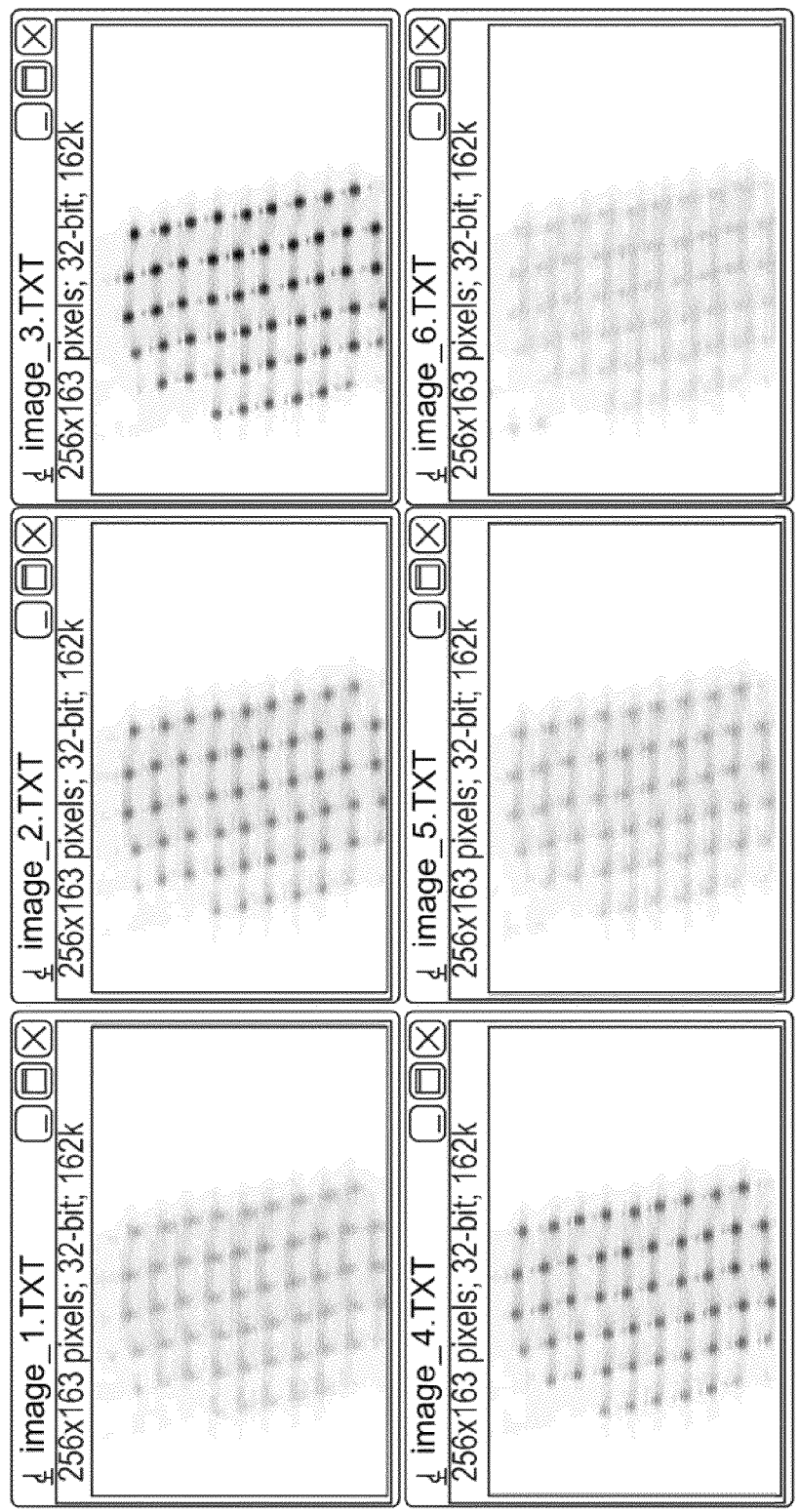
FIG. 10 illustrates a plurality of combined result images obtained from the scanned images in FIG. 9 by means of breaking down and combining.
Figure 11:
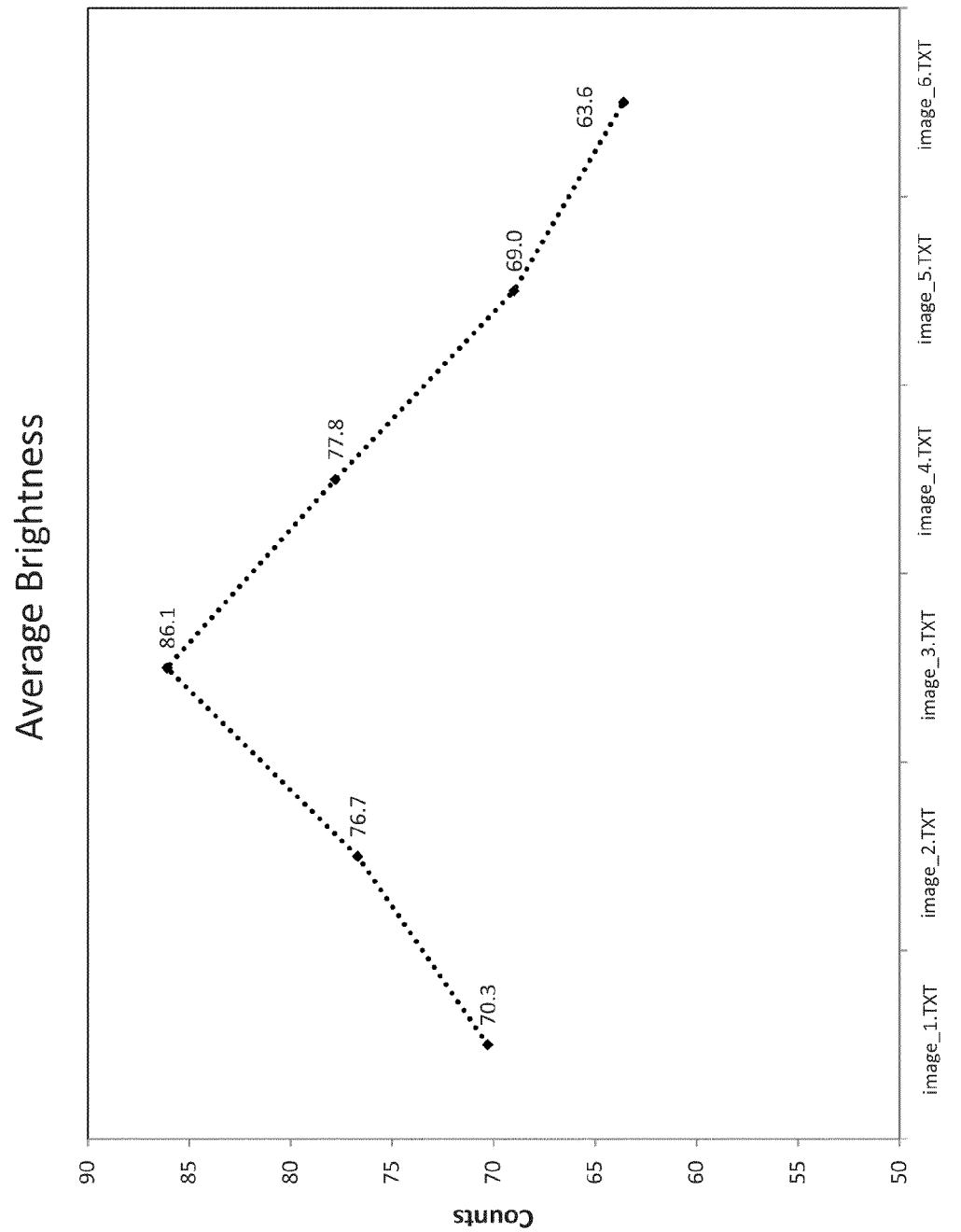
FIG. 11 illustrates a graphical representation for the respective overall brightness of the combined result images from FIG. 10.

FIG. 9 illustrates scanned images placed in a row edge to edge, in a manner similar to the representation in FIG. 6. As illustrated in FIG. 9, 81 scanned images are placed in a row, wherein the scanned images in each case take up 12 rows of detection elements in the region of the detection surface. FIGS. 10 and 11 illustrate combined result images as well as their assigned overall brightnesses in a manner similar to the representations in FIGS. 7 and 8.

In the method for optically scanning an object, partial scanning regions are optically captured in various scanning positions, wherein the imaged partial scanning regions laterally overlap in the object plane in which the object to be scanned is arranged, as the scanning step size is smaller than the extent of the partial scanning regions in the scanning direction in the object plane. The scanning direction is illustratively orientated substantially parallel to the object plane. The scanned images may be provided in a digitised form.

In contrast with conventional scanning in which scanned images are generated one after the other, which are then combined "edge to edge", the scanned images recorded in adjacent scanning positions comprise sections of the partial scanning regions recorded twice or a number of times according to the present disclosure. As such, sections of the scanning region are captured in scanned images twice or a number of times. With the aid of the subsequent image breakdown of the scanned images and the combining to a plurality of combined result images, this type of overlapping is at least "anulled" again to some extent, in order to finally select an object measurement image which may be evaluated further, for example for identifying a bodily fluid in connection with the optical analysis of testing or sample elements.

In one embodiment, a plurality of result images can be selected as object measurement images if the result images are of similarly good quality, for example. One object measurement image may then be selected or derived from the plurality of result images, for example with the aid of the formation of an average value.

The imaging of partial scanning regions having a greater extent in the scanning direction than the scanning step size supports the imaging of the object of interest or of regions thereof, for example of a detection zone on a testing or sample element, even in the event that the adjustment of the detection device is not optimal with respect to the object, so that a lateral offset of the optical image into the image plane results, for example. For the user of a device for optical scanning, the measurement process is facilitated in such a manner that an "optimal adjustment" is not always necessary, for example after the change of a sample on the sample receptacle. This may lead to saving time when analysing a plurality of samples.

In one embodiment, the respective overall brightness of the combined result images are used as the selection criterion. For example, the combined result image with the greatest overall brightness, for which an optimised signal-to-noise ratio can be expected, is selected as the selected measurement image for further analysis, for example with the aid of image evaluation software.

In one embodiment, the combined result images are generated containing at least one scanned part image from each of the scanned images. In one embodiment, the combined result images contain exactly one scanned part image from each of the scanned images.

The plurality of scanned images are broken down into strip-shaped scanned part images with a strip width corresponding to a whole number multiple of the scanning step size imaged from the object plane into the image plane. In the simplest case, the strip width of the strip-shaped scanned images corresponds to a width which results if the length of the scanning step size is imaged from the object plane into the image plane with the optical imaging system of the detection device.

In one embodiment, the scanning step size is set so that the scanning step size imaged from the object plane into the image plane corresponds to a whole number multiple of a width of a detection element in the detection surface in the scanning direction. The width of a detection element corresponds, for example, to the pixel width of pixel elements which form the detection surface. In the case of strip-shaped scanned part images, it is also possible to speak of a so-called row width.

In one embodiment, the scanned images are imaged onto one detection surface region of the detection surface. As such, the scanned images are imaged onto the same group of detection elements of the detection surface in every scanning position. In this and other embodiments, this may concern a row arrangement of detection elements. However, the imaging onto a two-dimensionally formed arrangement of detection elements may also be provided.

In one embodiment, the optical scanning is carried out in accordance with the Scheimpflug principle. The Scheimpflug principle or the Scheimpflug condition states that in the case of optical or photographic imaging, the image, objective, and sharpness planes either lie parallel to one another or else intersect one another in a common intersection line.

The object plane and the image plane may be arranged substantially parallel to one another during the optical scanning. The scanning direction may then run substantially parallel to both planes.

In one embodiment, at least a portion of the scanned part images are generated as scanned part images which overlap in a scanned image during the breaking down of the plurality of scanned images. In this embodiment, two adjacent scanned part images, which are produced during the breaking down of a scanned image, comprise at least one scanned image region jointly, which may be treated as a common image region. Common image regions of this type may be provided in one or a plurality of the broken down scanned images.

In one embodiment, at least a portion of the scanned part images are generated as scanned part images which do not overlap in a scanned image during the breaking down of the plurality of scanned images.

One embodiment of the previously described method is explained in the following on the basis of a mathematical consideration. A "block" is defined as B (B=block size) joined rows, wherein B is linked to the geometric scanning step size. If, for example, N blocks with B=2 are provided, the scanned image corresponding to the image section of the detection surface in the image plane that is saved in every scanning step has the following structure:

|  |  |
|---|---|
| Row 1 | Block 1 |
| Row 2 |  |
| Row 3 | Block 2 |
| Row 4 |  |
| ... | ... |
| Row 2(n − 1) + 1 | Block n |
| Row 2n |  |
| ... | ... |
| Row 2(N − 1) + 1 | Block N |
| Row 2N |  |

In the determined and saved image section, in which the scanned image is generated, the number of rows of detection elements in the detection surface can be divided by B without a remainder. That is to say, the following condition is satisfied:

$$\text{row\_number\_in\_image section mod B} = 0 \qquad \text{Eq. 1}$$

M is the number of blocks in a scanned image. The $n^{th}$ block in the $m^{th}$ scanned image is $$\Omega_{n,m}, n=1, 2, \ldots, N \; m=1, 2, \ldots, M \qquad \text{Eq. 2}$$

The scanned images $O_i$ (i=1, 2, ..., M) are generated as follows by the joining together of blocks.

$$O_1 = \Omega_{1,1} \oplus \Omega_{1,2} \oplus \ldots \Omega_{1,n} \oplus \ldots \oplus \Omega_{1,N} \qquad \text{Eq. 3}$$

$$O_i = \Omega_{i,1} \oplus \Omega_{i,2} \oplus \ldots \Omega_{i,n} \oplus \ldots \oplus \Omega_{i,N} \qquad \text{Eq. 4}$$

$$O_M = \Omega_{M,1} \oplus \Omega_{M,2} \oplus \ldots \Omega_{M,n} \oplus \ldots \oplus \Omega_{M,N} \qquad \text{Eq. 5}$$

$\oplus$ is the "additive operator", in the case of which, two blocks are joined by adding the first row of the second block after the last row of the first.

With the "aggregate additive operator"

$$\bigcup_{from}^{to} = \Omega_{from} \oplus \ldots \oplus \Omega_{to},$$

the generation of the M scanned images can in general be described as:

$$O_i = \bigcup_{n=1}^{n=N} \Omega_{i,n} \; i = 1, 2, \ldots, M \qquad \text{Eq. 6}$$

In one embodiment, the individual scanned images $S_j$ (j=1, 2, ..., M) are transmitted attached to one another in a single large image $\Gamma_i$ (i=1, 2, ..., M*N*B). In this case, the large element must be divided into the original scanned images once more, before the breaking down of the scanned images can be undertaken.

With the "cutting operator"

$$\bigcap_{from\_row}^{to\_row},$$

the individual result images $S_j$ are restored as follows:

$$S_j = \bigcap_{i=(j-1) \cdot B \cdot N + 1}^{i = j \cdot B \cdot N} \Gamma_i \; j = 1, 2, \ldots, M \qquad \text{Eq. 7}$$

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

The invention claimed is:

1. A method for optically scanning an object, wherein the method comprises the following steps:
   optically scanning a scanning region of the object by means of a detection device by displacing the detection device and the object relatively to one another into successive scanning positions which are spaced apart by a constant scanning step size along a scanning direction in an object plane;
   generating a plurality of scanned images by imaging a partial scanning region from the object plane onto a detection surface in an image plane by means of an optical imaging device in the scanning positions, wherein the partial scanning region has an extent in the scanning direction in the object plane which is larger than the scanning step size;
   breaking down the plurality of scanned images into scanned part images in each case by means of image processing;
   generating combined result images by combining a plurality of scanned part images in each case; and
   selecting at least one object measurement image from the combined result images in accordance with one or a plurality of predetermined selection criteria.

2. The method according to claim 1, wherein the respective overall brightness of the combined result images is used as the selection criterion.

3. The method according to claim 1, wherein the combined result images are generated containing at least one scanned part image from each of the scanned images.

4. The method according to claim 1, wherein the plurality of scanned images is broken down into strip-shaped scanned part images with a strip width corresponding to a whole number multiple of the scanning step size imaged from the object plane into the image plane in each case during the breaking down.

5. The method according to claim 1, wherein the scanning step size is set so that the scanning step size imaged from the object plane into the image plane corresponds to a whole number multiple of a width of a detection element in the detection surface in the scanning direction.

6. The method according to claim 1, wherein the scanned images are imaged onto one and the same detection surface region of the detection surface.

7. The method according to claim 1, wherein the optically scanning step is carried out in accordance with the Scheimpflug principle.

8. The method according to claim 1, wherein the object plane and the image plane are arranged essentially parallel to one another during the optical scanning.

9. The method according to claim 1, wherein at least a portion of the scanned part images are generated as scanned part images which overlap in a scanned image during the breaking down of the plurality of scanned images.

10. The method according to claim 1, wherein at least a portion of the scanned part images are generated as scanned part images which do not overlap in a scanned image during the breaking down of the plurality of scanned images.

11. An optical scanning device for optically scanning an object, comprising:
an object receptacle;
an optical detection device;
a displacement device configured to displace the object receptacle and the detection device relative to one another in successive scanning positions during the optical scanning of an object arranged on the object receptacle; and
a control device configured to control the optical scanning, the control device including a storage device that contains instructions that when interpreted by the control device cause the optical scanning device to:
optically scan a scanning region of the object by displacing the optical detection device relative to the object into successive scanning positions which are spaced apart by a constant scanning step size along a scanning direction in an object plane;
generate a plurality of scanned images by imaging a partial scanning region from the object plane onto a detection surface of the optical detection device in an image plane by means of an optical imaging device in the scanning positions, wherein the partial scanning region has an extent in the scanning direction in the object plane which is larger than the scanning step size;
break down the plurality of scanned images into scanned part images in each case by means of image processing;
generate combined result images by combining a plurality of scanned part images in each case; and
select at least one object measurement image from the combined result images in accordance with one or a plurality of predetermined selection criteria.

12. A computer program product with program code that is stored on a non-transitory computer-readable storage medium and that includes instructions that instruct an optical scanning device to
optically scan a scanning region of an object by displacing an optical detection device relative to the object into successive scanning positions which are spaced apart by a constant scanning step size along a scanning direction in an object plane;
generate a plurality of scanned images by imaging a partial scanning region from the object plane onto a detection surface of the optical detection device in an image plane using an optical imaging device in the scanning positions, wherein the partial scanning region has an extent in the scanning direction in the object plane which is larger than the scanning step size;
break down the plurality of scanned images into scanned part images in each case using image processing;
generate combined result images by combining a plurality of scanned part images in each case; and
select at least one object measurement image from the combined result images in accordance with one or a plurality of predetermined selection criteria.

13. A method of optically scanning a scanning region of an object, the method comprising the steps of:
displacing a detection device relative to the object into successive scanning positions spaced apart by a constant scanning step size along a scanning direction;
generating a plurality of scanned images by imaging a partial scanning region of the object onto a detection surface of the detection device at each scanning position, the partial scanning region having a size in the scanning direction larger than the scanning step size;
breaking down each scanned image into a plurality of scanned part images; and
generating a plurality of combined result images by combining scanned part images from the plurality of scanned images.

14. The method of claim 13, further comprising the step of selecting at least one object measurement image from the plurality of combined result images according to at least one predetermined selection criteria.

15. The method of claim 14, wherein the respective overall brightness of the combined result images is used as the selection criterion.

16. The method of claim 14, wherein the combined result images each contain at least one scanned part image from each of the plurality of scanned images.

17. The method of claim 16, wherein the scanned part images each have a size in the scanning direction corresponding to a whole number multiple of the scanning step size.

18. The method of claim 16, wherein scanning step size corresponds to a whole number multiple of a size in the scanning direction of a detection element in the detection surface of the detection device.

19. A device for optically scanning an object, the device comprising:
an object receptacle;
an optical detection device configured to generate a scanned image of an object positioned on the object receptacle by imaging a partial scanning region of the object;
a displacement device configured to displace the optical detection device relative to the object receptacle into successive scanning positions spaced apart by a constant scanning step size along a scanning direction, the optical detection device being configured to generate a scanned image at each scanning position, the partial scanning region of the object having a size in the scanning direction larger than the scanning step size; and
a control device configured to control the optical scanning of the object, the control device being configured to break down each scanned image into a plurality of scanned part images and to generate a plurality of combined result images by combining scanned part images from the plurality of scanned images.

20. The device of claim 19, wherein the control device is configured to select at least one object measurement image from the plurality of combined result images according to at least one predetermined selection criteria, the plurality of combined result images each containing at least one scanned part image from each of the plurality of scanned images.

* * * * *